(12) United States Patent
John Wilson et al.

(10) Patent No.: US 11,546,906 B2
(45) Date of Patent: *Jan. 3, 2023

(54) MULTI-LINK CONTROL BEAM SWITCHING

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Xiao Feng Wang, San Diego, CA (US); Sumeeth Nagaraja, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/811,239

(22) Filed: Mar. 6, 2020

(65) Prior Publication Data

US 2020/0205145 A1 Jun. 25, 2020

Related U.S. Application Data

(63) Continuation of application No. 15/905,897, filed on Feb. 27, 2018, now Pat. No. 10,602,520.

(Continued)

(51) Int. Cl.
*H04W 72/04* (2009.01)
*H04W 16/28* (2009.01)
(Continued)

(52) U.S. Cl.
CPC ........ *H04W 72/046* (2013.01); *H04B 7/0617* (2013.01); *H04B 7/0695* (2013.01);
(Continued)

(58) Field of Classification Search
CPC ... H04W 72/046; H04W 76/19; H04W 16/28; H04W 72/042; H04W 88/08;
(Continued)

(56) References Cited

U.S. PATENT DOCUMENTS 5,023,873 A 6/1991 Stevenson et al.
9,497,002 B2 11/2016 Wei
(Continued)

FOREIGN PATENT DOCUMENTS

WO 2017022902 A1 2/2017
WO 2017024516 A1 2/2017
(Continued)

OTHER PUBLICATIONS

Intel Corporation: "Discussion on Network Initiated Beam Recovery in NR", R1-1700345, 3GPP Draft; Further Discussion on Network Initiated Beam Recovery in NR, 3rd Generation Partnership Project (3GPP), Mobile Competence Centre; 650, Route Des Lucioles; F-06921 Sophia-Antipolis, vol. RAN WG1, No. Spokane, USA Jan. 16, 2017-Jan. 20, 2017, Jan. 16, 2017, 4 Pages, XP051207882, Retrieved from the Internet: URL: http://www.3gpp.org/ftp/Meetings_3GPP_SYNC/RAN1/Docs/[retrieved on Jan. 16, 2017].

(Continued)

*Primary Examiner* — Will W Lin
(74) *Attorney, Agent, or Firm* — Patterson + Sheridan, L.L.P.

(57) ABSTRACT

Certain aspects of the present disclosure provide techniques for switching control beams in multi-link systems using new radio (NR) technology multiple-input multiple-output (MIMO) techniques. A user equipment (UE) may obtain a configuration from a base station (BS) comprising at least one first pattern of beams to monitor when performing a beam recovery procedure, communicate using beamforming, with the BS, via an active transmit and receive beam (Continued)

pair, determine a beam failure of the active transmit and receive beam pair, and monitor the beams according to the first pattern in response to the beam failure.

35 Claims, 11 Drawing Sheets

Related U.S. Application Data

(60) Provisional application No. 62/476,165, filed on Mar. 24, 2017.

(51) Int. Cl.
| | | |
|---|---|---|
| *H04B 7/06* | (2006.01) | |
| *H04W 76/19* | (2018.01) | |
| *H04B 7/08* | (2006.01) | |
| *H04L 1/18* | (2006.01) | |
| *H04W 88/08* | (2009.01) | |
| *H04W 88/02* | (2009.01) | |
| *H04L 5/00* | (2006.01) | |

(52) U.S. Cl.
CPC ............... *H04B 7/088* (2013.01); *H04L 1/18* (2013.01); *H04W 16/28* (2013.01); *H04W 72/042* (2013.01); *H04W 76/19* (2018.02); *H04L 1/1861* (2013.01); *H04L 5/0055* (2013.01); *H04W 88/02* (2013.01); *H04W 88/08* (2013.01)

(58) Field of Classification Search
CPC ..... H04W 88/02; H04B 7/0695; H04B 7/088; H04B 7/0617; H04L 1/18; H04L 1/1861; H04L 5/0055
See application file for complete search history.

(56) References Cited

U.S. PATENT DOCUMENTS

| | | |
|---|---|---|
| 10,602,520 B2 | 3/2020 | John Wilson et al. |
| 2016/0192433 A1 | 6/2016 | Deenoo et al. |
| 2017/0118658 A1* | 4/2017 | Hwang ................. H04W 16/32 |
| 2017/0195028 A1* | 7/2017 | Shimezawa ........... H04L 1/0026 |
| 2017/0251518 A1 | 8/2017 | Agiwal et al. |
| 2018/0027456 A1* | 1/2018 | Nagasaka ............. H04L 5/0032 |
| | | 370/331 |
| 2018/0219606 A1 | 8/2018 | Ng et al. |
| 2018/0227887 A1 | 8/2018 | Hakola et al. |
| 2018/0227899 A1* | 8/2018 | Yu ............................ H04B 7/02 |
| 2018/0278310 A1* | 9/2018 | Lee ...................... H04B 7/0645 |
| 2018/0309496 A1 | 10/2018 | Lee et al. |
| 2019/0174423 A1 | 6/2019 | Zhang et al. |
| 2019/0254078 A1* | 8/2019 | Zhang ............... H04W 72/0446 |
| 2019/0335522 A1 | 10/2019 | Zhang et al. |
| 2020/0028603 A1* | 1/2020 | Wang .................... H04L 5/0051 |
| 2020/0059398 A1* | 2/2020 | Pan ....................... H04L 5/0048 |
| 2020/0076556 A1* | 3/2020 | Takahashi ............. H04L 1/0026 |
| 2020/0099437 A1* | 3/2020 | Harada ................. H04L 5/0053 |
| 2020/0275514 A1* | 8/2020 | Takahashi ............. H04W 16/28 |

FOREIGN PATENT DOCUMENTS

| | | |
|---|---|---|
| WO | 2017123060 A1 | 7/2017 |
| WO | 2017151876 A1 | 9/2017 |
| WO | 2017171867 A1 | 10/2017 |

OTHER PUBLICATIONS

International Search Report and Written Opinion—PCT/US2018/020070—ISA/EPO—dated May 11, 2018.
European Search Report—EP21206951—Search Authority—Munich—dated Jan. 26, 2022.
Nokia, et al., "Multi-Beam Control Channel Transmission", 3GPP TSG RAN WG1 NR Ad-Hoc Meeting, 3GPP Draft, R1-1701093, 3rd Generation Partnership Project (3GPP), RAN WG1, Spokane, USA, 5 Pages, Jan. 16, 2017-Jan. 20, 2017, Jan. 9, 2017.
Guangdong Oppo Mobile Telecom: "On Beam Recovery Mechanism", R1-1701944, 3GPP Draft, 3GPP TSG RAN WG1 Meeting #88, Athens, Greece Feb. 13-17, 2017, 4 Pages, Feb. 6, 2017.

* cited by examiner

MULTI-LINK CONTROL BEAM SWITCHING

CROSS-REFERENCE TO RELATED APPLICATIONS

This application is a continuation of U.S. patent application Ser. No. 15/905,897, filed on Feb. 27, 2018, which claims priority U.S. Provisional Application No. 62/476,165, filed on Mar. 24, 2017, which are assigned to the assignee of the present application and hereby expressly incorporated by reference herein in their entireties.

INTRODUCTION

Aspects of the present disclosure relate generally to wireless communications systems, and more particularly, to switching control beams in multi-link systems using new radio (NR) technology multiple-input multiple-output (MIMO) techniques.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of NodeBs that can support communication for a number of user equipments (UEs). A UE may communicate with a NodeB via the downlink and uplink. The downlink (or forward link) refers to the communication link from the NodeB to the UE, and the uplink (or reverse link) refers to the communication link from the UE to the NodeB.

These multiple access technologies have been adopted in various telecommunication standards to provide a common protocol that enables different wireless devices to communicate on a municipal, national, regional, and even global level. An example of an emerging telecommunication standard is new radio (NR, e.g., $5^{th}$ Generation (5G) radio access). NR is a set of enhancements to the LTE mobile standard promulgated by Third Generation Partnership Project (3GPP). It is designed to better support mobile broadband Internet access by improving spectral efficiency, lower costs, improve services, making use of new spectrum, and better integrating with other open standards using OFDMA with a cyclic prefix (CP) on the downlink (DL) and on the uplink (UL) as well as supporting beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the present disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for switching control beams in multi-link systems using new radio (NR) technology multiple-input multiple-output techniques are described herein.

In an aspect, a method for wireless communications is provided. The method may be performed, for example, by a user equipment (UE). The method generally includes obtaining a configuration from a base station (BS) comprising at least one first pattern of beams to monitor when performing a beam recovery procedure, communicating using beamforming, with the BS, via an active transmit and receive beam pair, determining a beam failure of the active transmit and receive beam pair, and monitoring the beams according to the first pattern in response to the beam failure.

In an aspect, a method for wireless communications is provided. The method may be performed, for example, by a wireless node. The method generally includes providing a configuration to a user equipment (UE) comprising at least one first pattern of beams to monitor when performing a beam recovery procedure, communicating using beamforming, with the UE, via an active transmit and receive beam pair, determining a beam failure of the active transmit and receive beam pair, and sending, to the UE and via a transmit beam in the first pattern of beams, an indication to monitor a second pattern of beams.

In an aspect, an apparatus for wireless communications is provided. The apparatus includes a processor configured to obtain a configuration, from a downlink control information (DCI) in a first signal from a base station (BS), comprising at least one first pattern of beams to monitor when performing a beam recovery procedure, to cause the apparatus to send a first acknowledgment of the DCI to the BS, to cause the apparatus to communicate using beamforming, with the BS, via an active transmit and receive beam pair, to determine a beam failure of the active transmit and receive beam pair, and to cause the apparatus to monitor the beams according to the first pattern in response to the beam failure, and a memory coupled with the processor.

In an aspect, an apparatus for wireless communications is provided. The apparatus includes a processor configured to cause the apparatus to provide a configuration, in a downlink control information (DCI) to a user equipment (UE), comprising at least one first pattern of beams to monitor when performing a beam recovery procedure, to cause the apparatus to receive a first acknowledgment of the DCI from the UE, to cause the apparatus to communicate using beamforming, with the UE, via an active transmit and receive beam pair, to determine a beam failure of the active transmit and receive beam pair, and to cause the apparatus to send, to the UE and via a transmit beam in the first pattern of beams, an indication to monitor a second pattern of beams, and a memory coupled with the processor.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
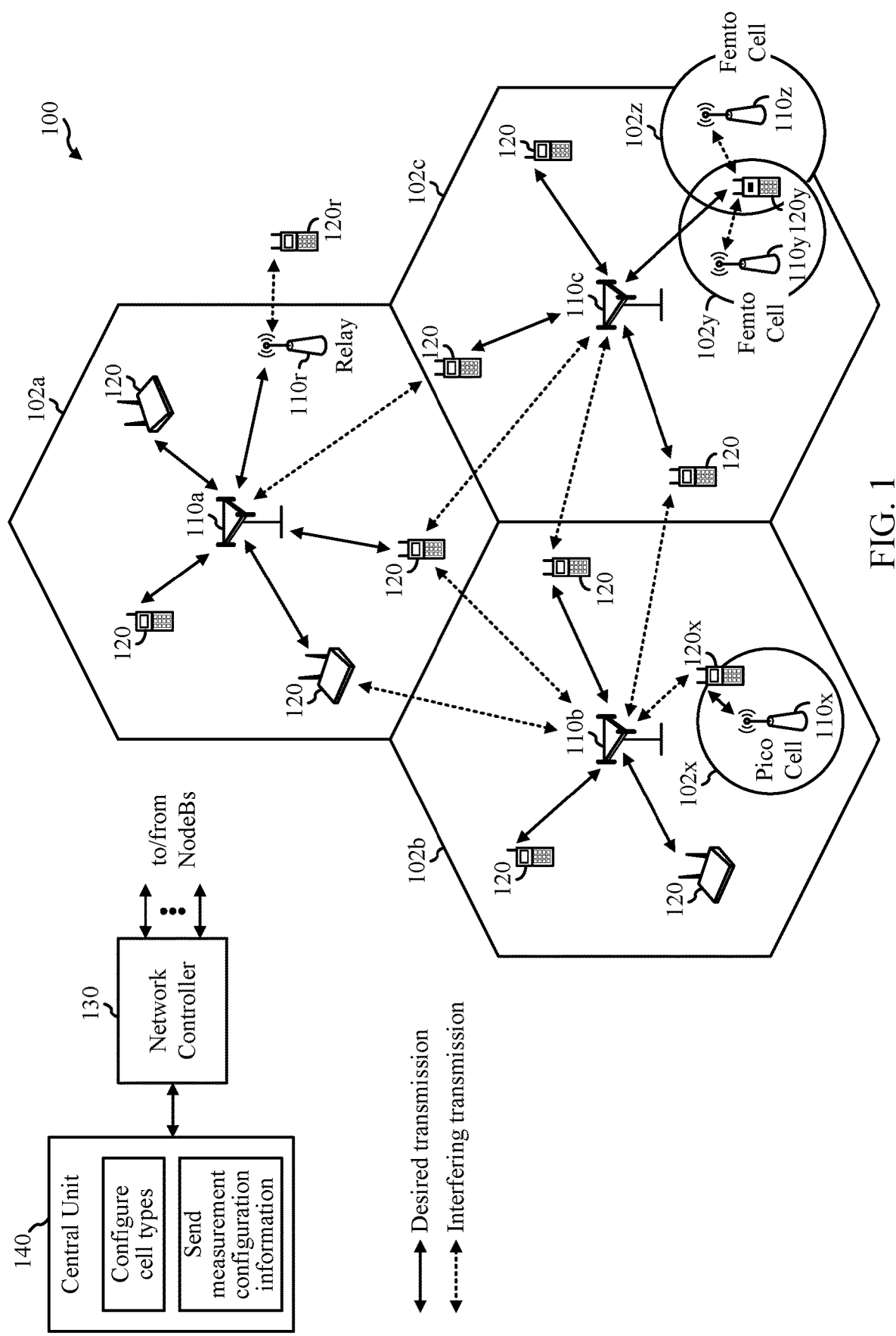
FIG. 1 is a block diagram conceptually illustrating an example telecommunications system, according to aspects of the present disclosure.

Aspects of the present disclosure provide apparatus, methods, processing systems, and computer program products for switching control beams in multi-link systems using new radio (NR) technology multiple-input multiple-output (MIMO) techniques. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) techniques targeting wide bandwidth (e.g. 80 MHz beyond) communications, millimeter wave (mmW) techniques targeting high carrier frequency (e.g. 60 GHz) communications, massive machine type communications (mMTC) techniques targeting non-backward compatible MTC techniques, and mission critical techniques targeting ultra reliable low latency communications (URLLC). For these general topics, different techniques are considered, including coding techniques such as low-density parity check (LDPC) coding, and polar coding. An NR cell may refer to a cell operating according to the new air interface or fixed transport layer. An NR NodeB (e.g., a 5G NodeB) may correspond to one or multiple transmission and reception points (TRPs).

NR cells can be configured as access cell (ACells) or data only cells (DCells). For example, a radio access network (RAN) (e.g., a central unit or a distributed unit) can configure the cells as ACells or DCells. DCells may be cells used for carrier aggregation or dual connectivity, but not used for initial access, cell selection/reselection, or handover. In some cases DCells, may not transmit synchronization signals (SS)—in other cases DCells may transmit SS. A TRP of a DCell or an ACell may transmit downlink signals to UEs indicating the cell type of the cell that the TRP serves. Based on the cell type indication, a UE may communicate with the TRP. For example, a UE may determine TRPs to consider for cell selection, access, handover, and/or measurement based on cell types indicated by the TRPs.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be a new radio or 5G network. UEs 120 may be configured to perform the operations 1200-2300, discussed in more detail below with reference to FIGS. 12-23, for dynamic multi-beam communications in NR systems. NodeB 110 may comprise a transmission and reception point (TRP) configured to perform operations complementary to operations 1200-2300. The new radio network 100 may comprise a central unit 140 configured to coordinate communications between TRPs, such as coordinated multi-point (CoMP) operations. According to certain aspects, the UEs 120, NodeBs (TRPs) 110, and central unit 140 may be configured to perform operations related to measuring and selecting beams for multiple-input multiple-output communications, which are described in greater detail below.

Each NodeB (TRP) 110 may provide communication coverage for a particular geographic area. In 3GPP (e.g., 4G, 5G, and NR) communications systems, the term "cell" can refer to a coverage area of a NodeB (e.g., a TRP) and/or a NodeB subsystem (e.g., a TRP) serving this coverage area, depending on the context in which the term is used.

A NodeB (e.g. a TRP) may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A NodeB for a macro cell may be referred to as a macro NodeB. A NodeB for a pico cell may be referred to as a pico NodeB. A NodeB for a femto cell may be referred to as a femto NodeB or a home NodeB. In the example shown in FIG. 1, the NodeBs 110a, 110b and 110c may be macro NodeBs for the macro cells 102a, 102b and 102c, respectively. The NodeB 110x may be a pico NodeB for a pico cell 102x. The NodeBs 110y and 110z may be femto NodeBs for the femto cells 102y and 102z, respectively. A NodeB may support one or multiple (e.g., three) cells.

The wireless network 100 may also include relay stations. A relay station is a station that receives a transmission of data and/or other information from an upstream station (e.g., a NodeB or a UE) and sends a transmission of the data and/or other information to a downstream station (e.g., a UE or a NodeB). A relay station may also be a UE that relays transmissions for other UEs. In the example shown in FIG. 1, a relay station 110r may communicate with the NodeB 110a and a UE 120r in order to facilitate communication between the NodeB 110a and the UE 120r. A relay station may also be referred to as a relay NodeB, a relay, etc.

The wireless network 100 may be a heterogeneous network that includes NodeBs of different types, e.g., macro NodeBs, pico NodeBs, femto NodeBs, relays, transmission reception points (TRPs), etc. These different types of NodeBs may have different transmit power levels, different coverage areas, and different impact on interference in the wireless network 100. For example, macro NodeBs may have a high transmit power level (e.g., 20 Watts) whereas pico NodeBs, femto NodeBs and relays may have a lower transmit power level (e.g., 1 Watt).

The wireless network 100 may support synchronous or asynchronous operation. For synchronous operation, the NodeBs may have similar frame timing, and transmissions from different NodeBs may be approximately aligned in time. For asynchronous operation, the NodeBs may have different frame timing, and transmissions from different NodeBs may not be aligned in time. The techniques described herein may be used for both synchronous and asynchronous operation.

A network controller 130 may couple to a set of NodeBs and provide coordination and control for these NodeBs. The network controller 130 may communicate with the NodeBs 110 via a backhaul. The NodeBs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro NodeBs, pico NodeBs, femto NodeBs, relays, etc. In FIG. 1, a solid line with double arrows indicates desired transmissions between a UE and a serving NodeB, which is a NodeB designated to serve the UE on the downlink and/or uplink. A dashed line with double arrows indicates interfering transmissions between a UE and a NodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K)

orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes and have a length of 10 ms. Consequently, each subframe may have a length of 0.2 ms. Each subframe may indicate a link direction (i.e., DL or UL) for data transmission and the link direction for each sub-frame may be dynamically switched. Each subframe may include data in the indicated link direction (i.e., DL or UL) as well as both DL and UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based air interface. NR networks may include entities such central units or distributed units.

Figure 2:
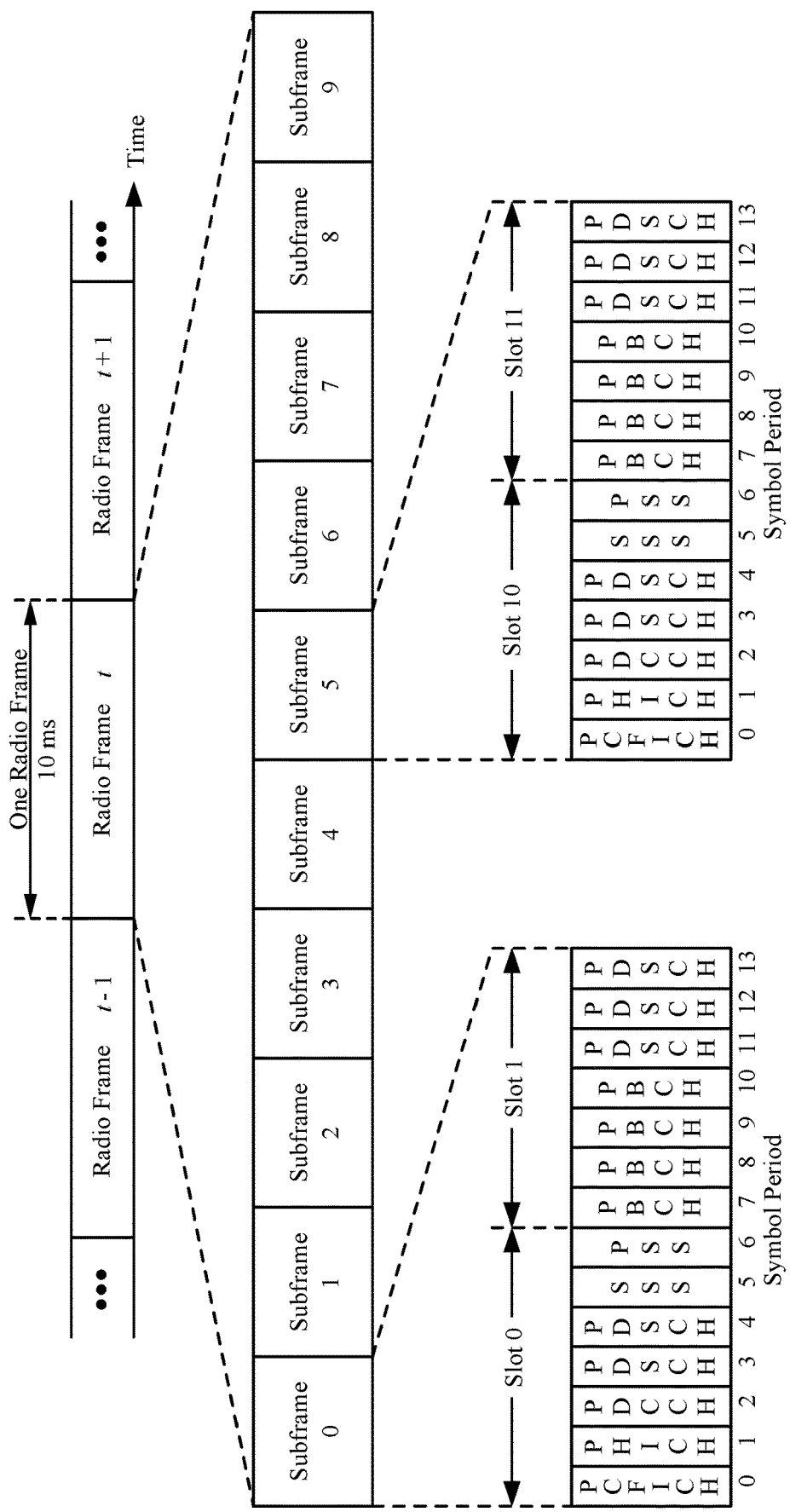
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a NodeB may send a primary synchronization signal (PSS) and a secondary synchronization signal (SSS) for each cell served by the NodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The NodeB may send a Physical Broadcast Channel (PBCH) in symbol periods 0 to 3 in slot 1 of sub-frame 0. The PBCH may carry certain system information.

The NodeB may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The NodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The NodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The NodeB may send the PSS, SSS and PBCH in the center 1.08 MHz of the system bandwidth used by the NodeB. The NodeB may send the PCFICH and PHICH across the entire system bandwidth in each symbol period in which these channels are sent. The NodeB may send the PDCCH to groups of UEs in certain portions of the system bandwidth. The NodeB may send the PDSCH to specific UEs in specific portions of the system bandwidth. The NodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one sub-carrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A NodeB may send the PDCCH to the UE in any of the combinations that the UE will search.

A UE may be within the coverage of multiple NodeBs. One of these NodeBs may be selected to serve the UE. The serving NodeB may be selected based on various criteria such as received power, path loss, signal-to-noise ratio (SNR), etc.

Figure 3:
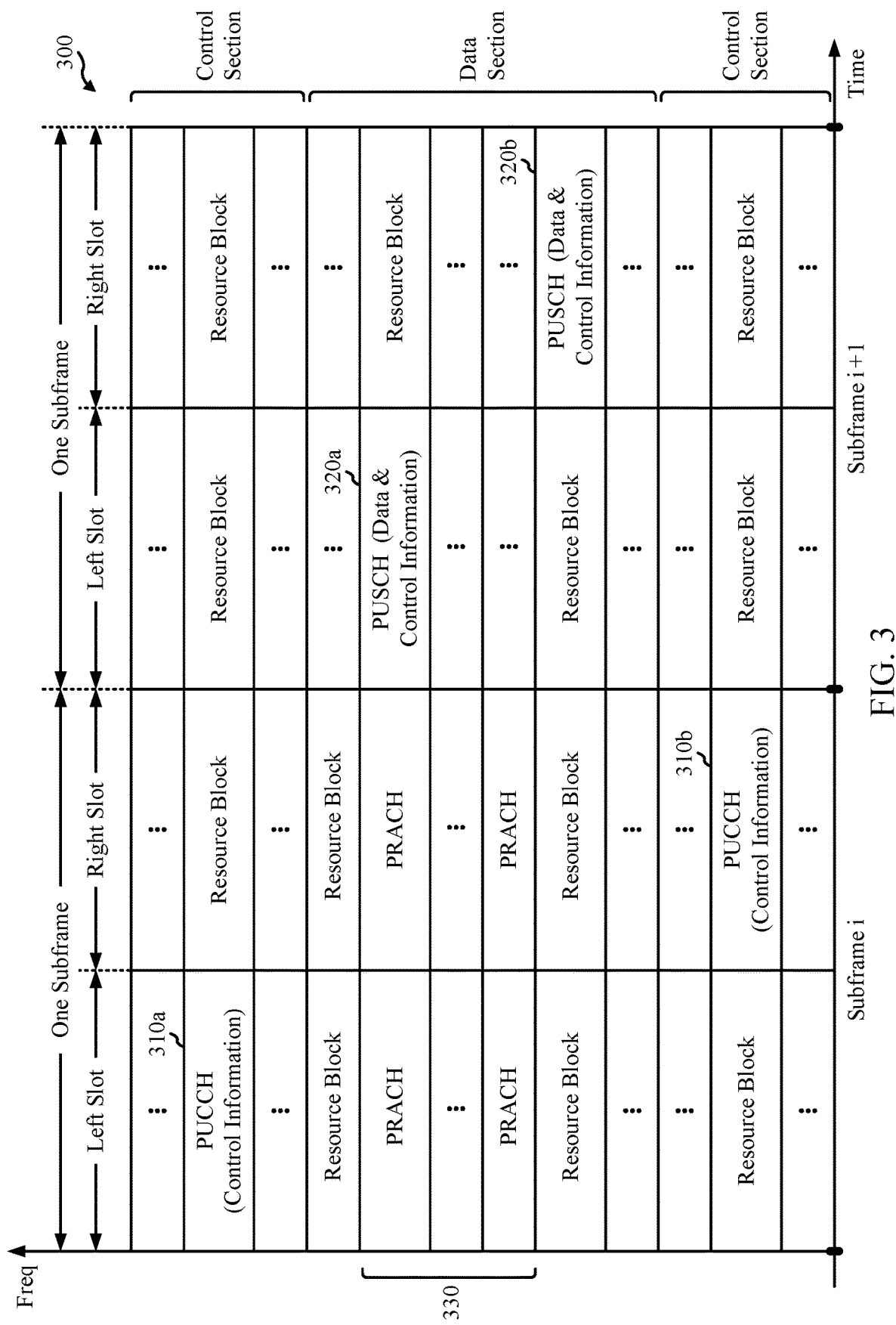
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to a NodeB. The UE may also be assigned resource blocks 320a, 320b in the data section to transmit data to the NodeB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
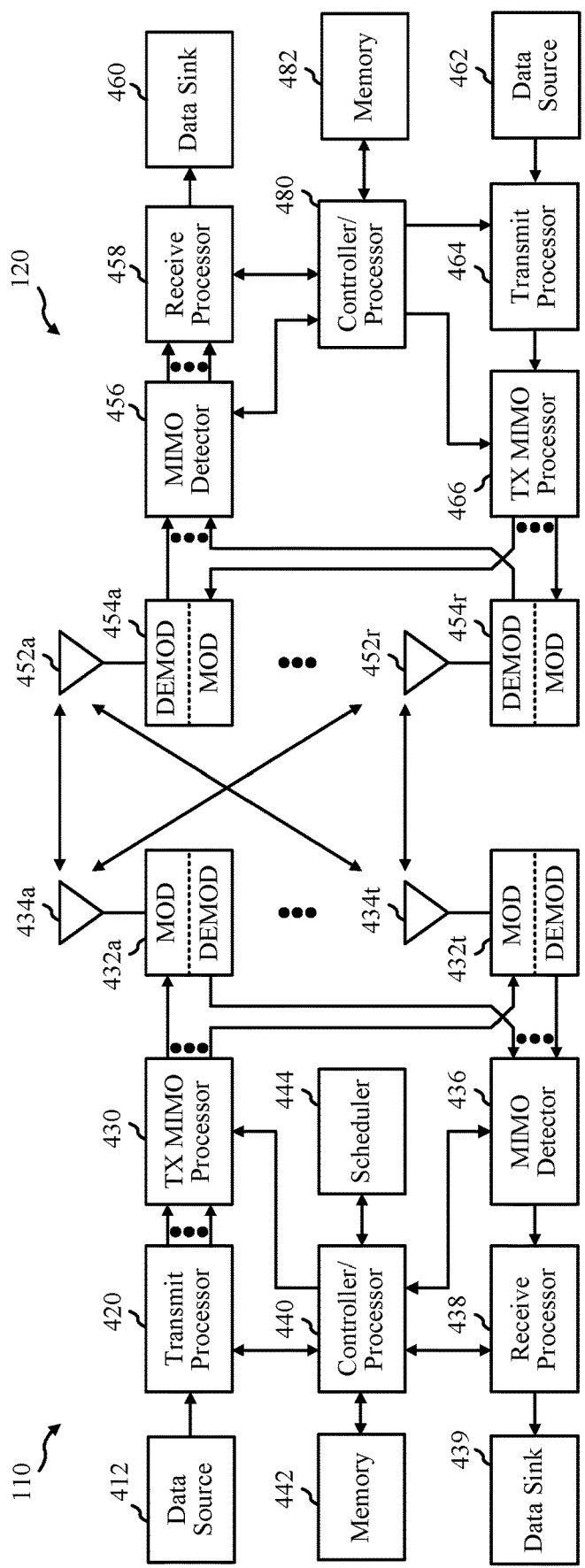
FIG. 4 is a block diagram conceptually illustrating a design of an example NodeB and user equipment (UE), according to aspects of the present disclosure.

FIG. 4 illustrates example components of the NodeB (e.g., TRP) 110 and UE 120 illustrated in FIG. 1, which may be used to implement aspects of the present disclosure. One or more components of the NodeB 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 12-23.

For a restricted association scenario, the NodeB 110 may be the macro NodeB 110c in FIG. 1, and the UE 120 may be the UE 120y. The NodeB 110 may also be a NodeB of some other type. The NodeB 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 12-23, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
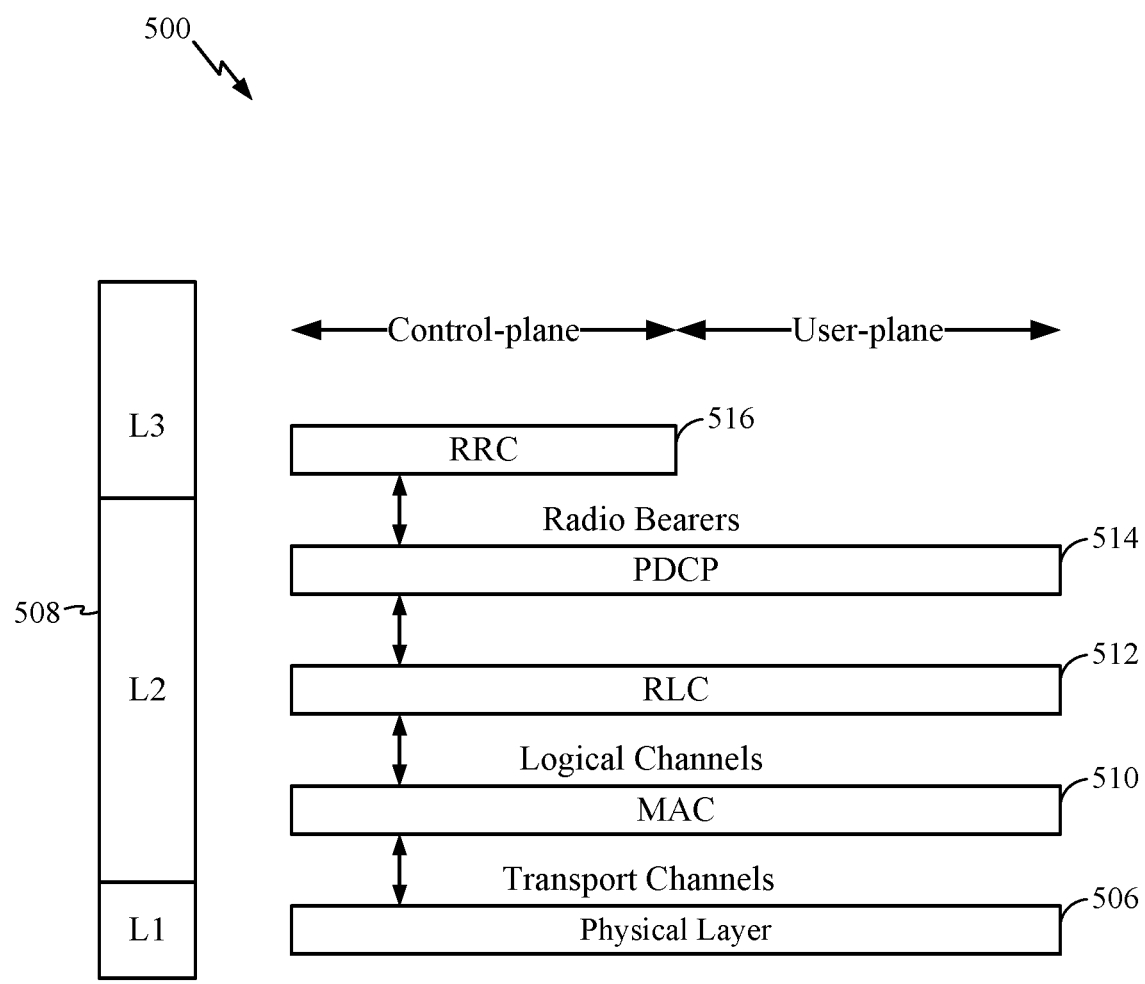
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the NodeB is shown with three layers: Layer 1, Layer 2, and Layer 3. Layer 1 (L1 layer) is the lowest layer and implements various physical layer signal processing functions. The L1 layer will be referred to herein as the physical layer 506.

Layer 2 (L2 layer) 508 is above the physical layer 506 and is responsible for the link between the UE and NodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the NodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between NodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and NodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the NodeB and the UE.

Figure 6:
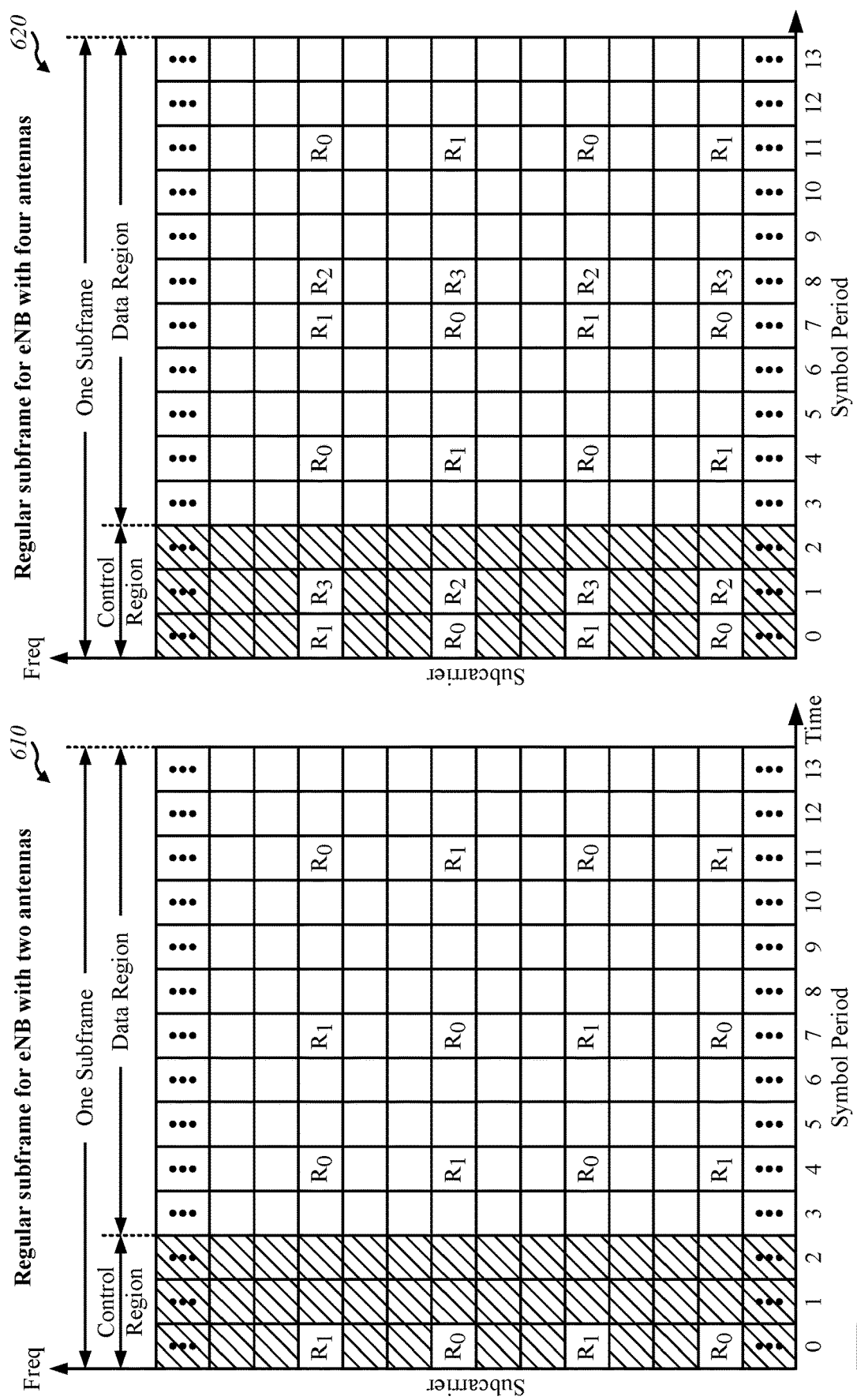
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a NodeB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a NodeB equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different NodeBs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., a NodeB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple NodeBs. One of these NodeBs may be selected to serve the UE. The serving NodeB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering NodeBs.

New radio (NR) may refer to radios configured to operate according a wireless standard, such as 5G (e.g., wireless network 100). NR may include Enhanced mobile broadband (eMBB) techniques targeting wide bandwidth (e.g. 80 MHz beyond) communications, millimeter wave (mmW) techniques targeting high carrier frequency (e.g. 60 GHz) communications, massive MTC (mMTC) techniques targeting communications with non-backward compatible MTC devices, and mission critical techniques targeting ultra reliable low latency communications (URLLC).

An NR cell may refer to a cell operating according in an NR network. A NR NodeB (e.g., NodeB 110) may correspond to one or multiple transmission and reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., central unit 140). The CU may be an Access node controller (ANC). The CU terminates a backhaul interface to the RAN core network (RAN-CN) and terminates backhaul interfaces to neighboring RAN nodes. The RAN may include a distributed unit that may be one or more TRPs that may be connected to one or more ANCs (not shown). TRPs may advertise System Information (e.g., a Global TRP identifier (TRP ID)), may include PDCP, RLC, and/or MAC functions, may comprise one or more antenna ports, and may be configured to individually (dynamic selection) or jointly (joint transmission) serve traffic to a UE.

Figure 7A:
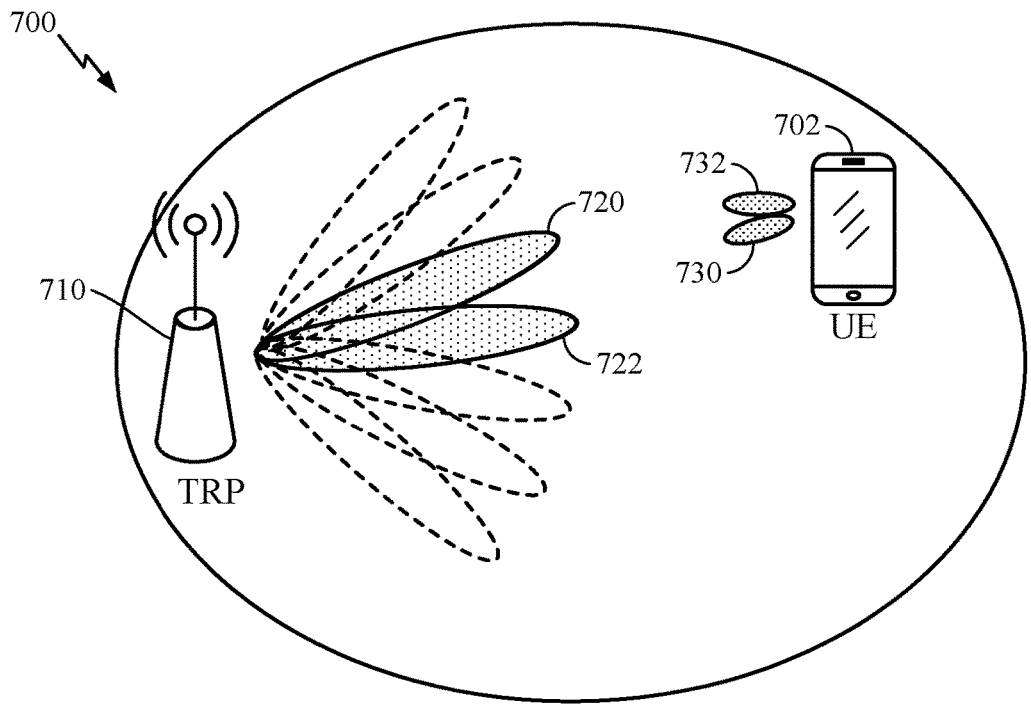
FIGS. 7A and 7B show exemplary wireless communications systems, in accordance with aspects of the present disclosure.
Figure 7B:
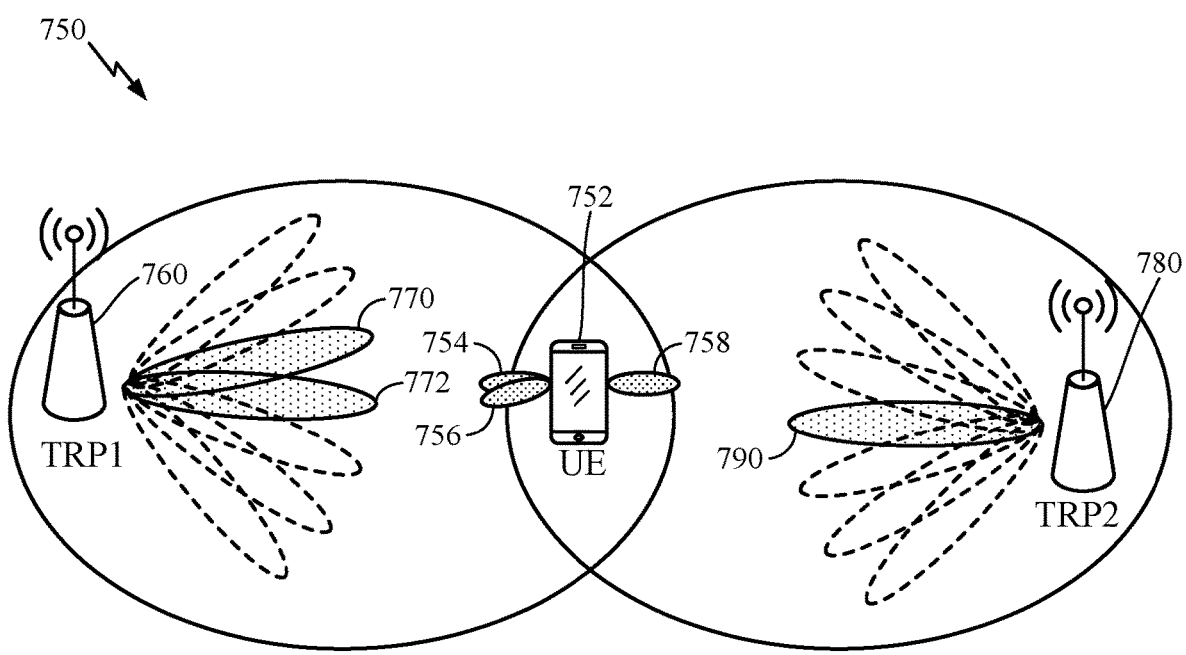

In NR communications systems, a UE may be served by one or more TRPs using single or multiple beams, as depicted in FIGS. 7A and 7B. FIG. 7A shows an exemplary wireless communications system 700 in which a UE 702 is being served by a single TRP 710 using two transmit beams 720, 722. The UE is receiving the transmissions from the TRP using two receive beams 730, 732. Each transmit beam and corresponding receive beam (e.g., transmit beam 720 and receive beam 730) may be referred to as an active transmit and receive beam pair.

FIG. 7B shows an exemplary wireless communications system 750 in which a UE 752 is being served by a TRP 760 using two beams 770, 772 and another TRP 780 (e.g., using joint transmission) using a single beam 790. The UE is receiving the transmissions from TRP 760 using two receive beams 754 and 756. The transmissions from TRP 780 are being received by the UE via a receive beam 758.

According to aspects of the present disclosure, a beam may be associated with one or more (beamformed) antenna ports, and an antenna port may be associated with a reference signal (RS). As used herein, a RS resource refers to a set of RSs and thus may be associated with a set of antenna ports and with a set of beams.

Figure 8A:
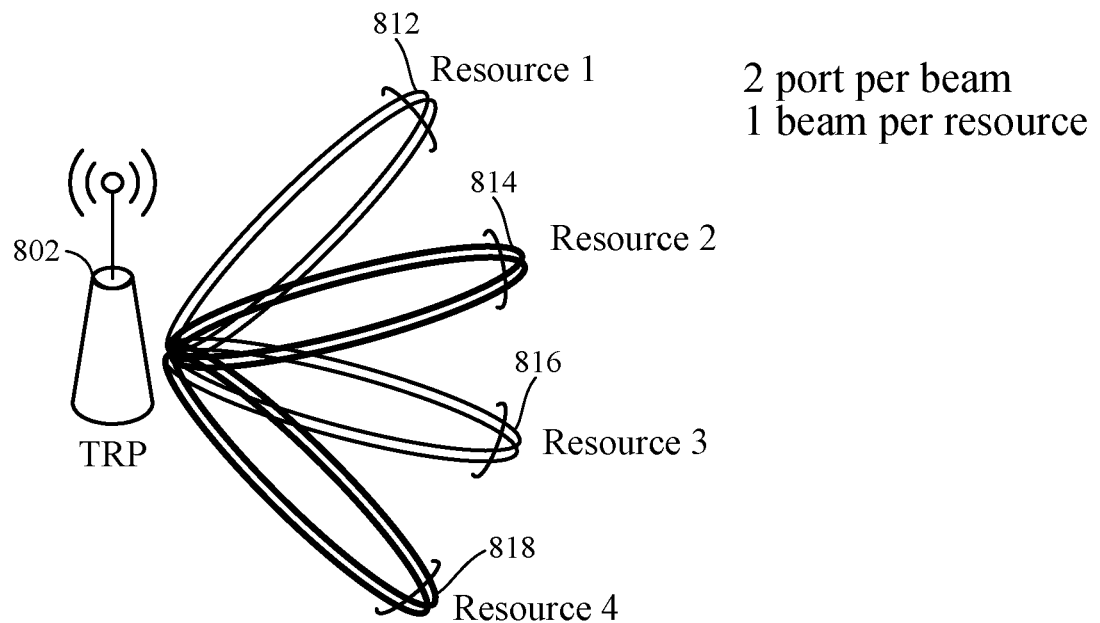
FIGS. 8A and 8B show exemplary associations of beams with reference signal resources and antenna ports, in accordance with aspects of the present disclosure.
Figure 8B:
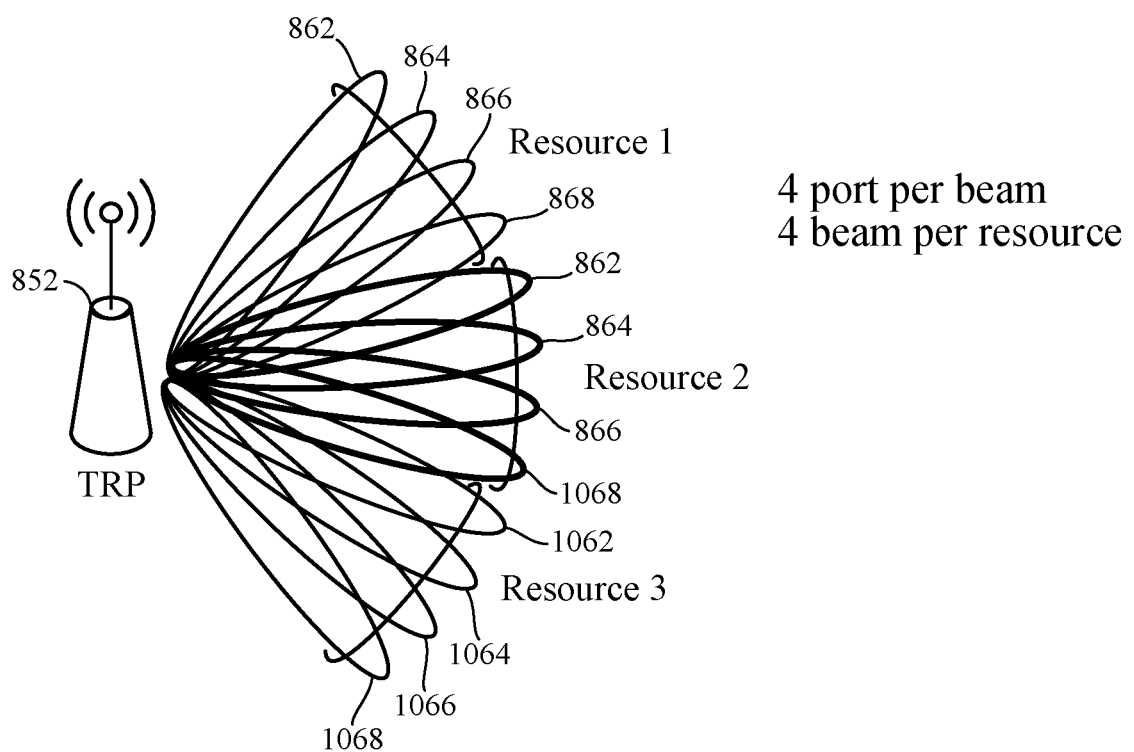

FIGS. 8A and 8B show exemplary associations of beams with reference signal resources and antenna ports. In FIG. 8A, each of four beams 812, 814, 816, 818 transmitted from TRP 1002 is associated with two antenna ports. The four beams are also each associated with one RS resource. In FOG. 8B, each of four beams 862, 864, 866, 868 transmitted from TRP 852 is associated with four antenna ports. The four beams are also each associated with three RS resources.

Example Multi-Link Control Beam Switching

According to aspects of the present disclosure, PDCCHs and PUCCHs may utilize (e.g., be transmitted and received via) more than one beam for communications between a BS (e.g., a TRP, an eNB) and a UE, in order to improve robustness of the control channel communications. Aspects of the present disclosure provide techniques for recovering from a beam pair failure in a communications system using multiple beams (e.g., multi-link) to convey control channels In aspects of the present disclosure, a UE may be configured (e.g., by a BS) to monitor PDCCH beams that are quasi-collocated with one or more CSI-RS port sets. The UE may receive PDCCHs transmitted via the configured beams and respond to the PDCCHs (e.g., receive data signals scheduled by the PDCCHs, transmit data and/or control signals scheduled by the PDCCHs).

According to aspects of the present disclosure, an eNB may configure a UE to transmit PUCCH using beams derived from PDCCH receive beams (e.g., beams configured on the UE for receiving PDCCHs) or derived from receive beams corresponding to CSI-RS/SS port sets.

In NR wireless communication systems, beam based transmissions may be used, wherein one or more layers of data are delivered to a UE using one or more antenna ports from a single or multiple TRPs. A layer(s) to port mapping may or may not be transparent to a UE receiving a transmission. That is, layers of a transmission to the UE may be mapped to antenna ports, and the UE may receive the transmission with or without having information regarding the mapping. By reporting CSI to a serving cell (e.g., to a TRP, to a NodeB), the UE may suggest use of a subset of beams and/or ports out of those associated with configured RS resource(s), the number of layers (e.g., suggested by the reported RI included in the CSI), and the MCS of each layer (e.g., suggested by the reported CQI included in the CSI), assuming a certain precoding (i.e., mapping from layers to the suggested beams/ports). The precoding may be determined according open loop or closed loop MIMO techniques. In the case of closed-loop MIMO (CL-MIMO), the precoding assumption for RI and/or CQI is also indicated by the UE reporting a precoding matrix indicator (PMI), which may also indicate that the UE suggests beam cycling. In the case of open-loop MIMO (OL-MIMO), the precoding assumption may be fully predetermined (e.g., in a network specification). For example, a defined codebook may be used, where the precoders in the codebook are cycled through in a series of transmissions. Additionally or alternatively, the precoding may be partially indicated by UE reporting a PMI and partially predetermined.

Figure 9:
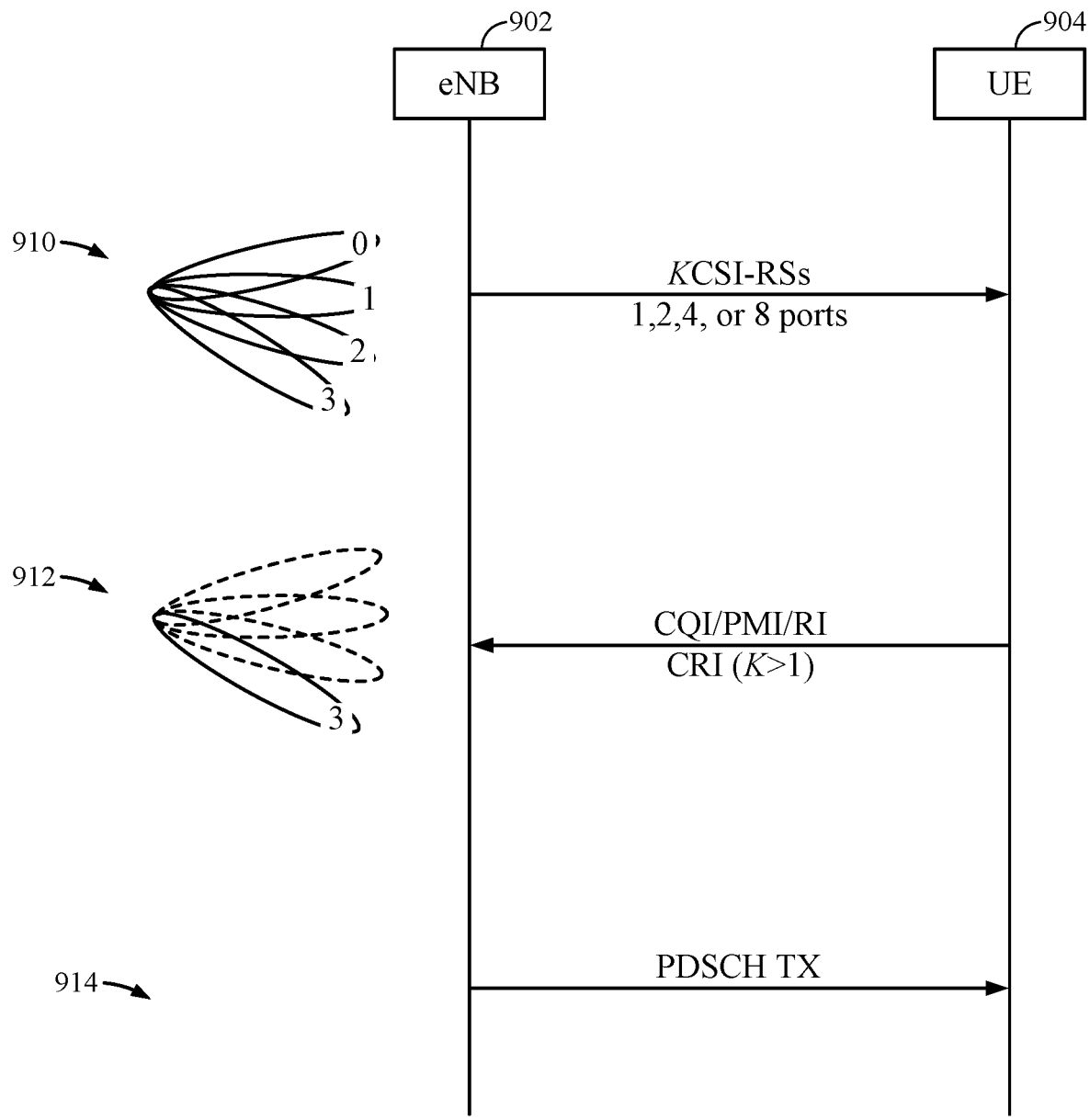
FIG. 9 illustrates an example communications system performing operations to report and receive CSI feedback (CSF) based on multiple BF CSI-RSs, in accordance with aspects of the present disclosure.

Two issues that may be addressed are i) how to have a UE assist a TRP (e.g., a NodeB) in selecting a beam and port, and, once selected, ii) how to have the UE report CSI based on this selection. FIG. 9 illustrates an example communications system 900 performing operations to report and receive CSI feedback (CSF) based on multiple beamformed (BF) CSI-RSs as mentioned above, according to aspects of the present disclosure. The exemplary communications system 900 includes an eNB 902 (e.g., a TRP) and a UE 904. In the exemplary communications system, the UE is configured (e.g., via RRC signaling and/or according to a communications standard) to detect and/or measure four BF CSI-RS resources (e.g., sets of time and frequency resources), although the UE may be configured to detect and/or measure one or more (i.e. K) BF CSI-RS resources to perform the described technique. Each BF CSI-RS resource could be associated with 1, 2, 4, or 8 ports corresponding to a particular beam pattern. The beam pattern could be a common beam pattern for all ports or a different beam pattern for each port. At 910, the eNB transmits four BF CSI-RSs using 1, 2, 4, or 8 antenna ports. The UE measures all K resources (that is, the K CSI-RS on the resources) and selects a best one for which to report CQI, PMI, and/or RI, assuming a closed-loop MIMO (CL-MIMO) transmission. At 912, the UE reports a wideband CSI-RS resource indicator (CRI) to the eNB indicating the CSI resource that the UE prefers and CSF, such as a CQI, PMI, and/or RI conditioned on the CSI-RS resource indicated by the CRI. At 914, the eNB transmits a data transmission, such as a PDSCH, with transmission parameters determined based on the CSF and the CSI-RS resource indicated by the CRI. While the example describes an eNB, the disclosure is not so limited, and the techniques described may be used in a communications system with a NodeB and/or one or more TRPs.

In aspects of the present disclosure, an eNB may configure (e.g., for a UE or a set of UEs) a set of PDCCH beam monitoring patterns and/or periodicities across slots and/or symbols. A UE configured with a PDCCH beam monitoring pattern may change beams that the UE monitors for PDCCHs according to the pattern.

As used herein, a "beam monitoring pattern" is a mapping of set(s) of beams to times when the set(s) of beams are to be monitored. For example, a beam monitoring pattern may be to monitor beam 1 during slot 0, monitor beam 2 during slot 1, and monitor beam 3 during slot 2. Another example of a pattern may be to monitor beams 1 and 2 during slot 0, monitor beam 1 during slot 1, and monitor beam 2 during slot 2. While the examples are limited to only three beams during three slots, aspects of the present disclosure are not so limited, and a beam monitoring pattern may refer to any number of beams over any length of time.

According to aspects of the present disclosure, an eNB can indicate in a PDCCH to a UE a PUCCH beam for the UE to use when transmitting a PUCCH to the eNB. The eNB may select the PUCCH beam based on interference conditions and/or other scheduled transmissions.

In aspects of the present disclosure, an eNB may additionally or alternatively configure a set of rules for deriving one or more PUCCH beams based on a PDCCH that schedules a PUCCH, and the eNB may indicate which of the rules to use via signaling (e.g., RRC signaling, an indication in a DCI).

According to aspects of the present disclosure, if an active beam pair used for control channel communications (e.g., receiving PDCCHs, transmitting PUCCHs) fails, a UE may be configured (e.g., by a BS) to monitor another beam for PDCCHs. Similarly, a BS may monitor another beam for PUCCHs from the UE, in the event of a beam failure.

Figure 10:
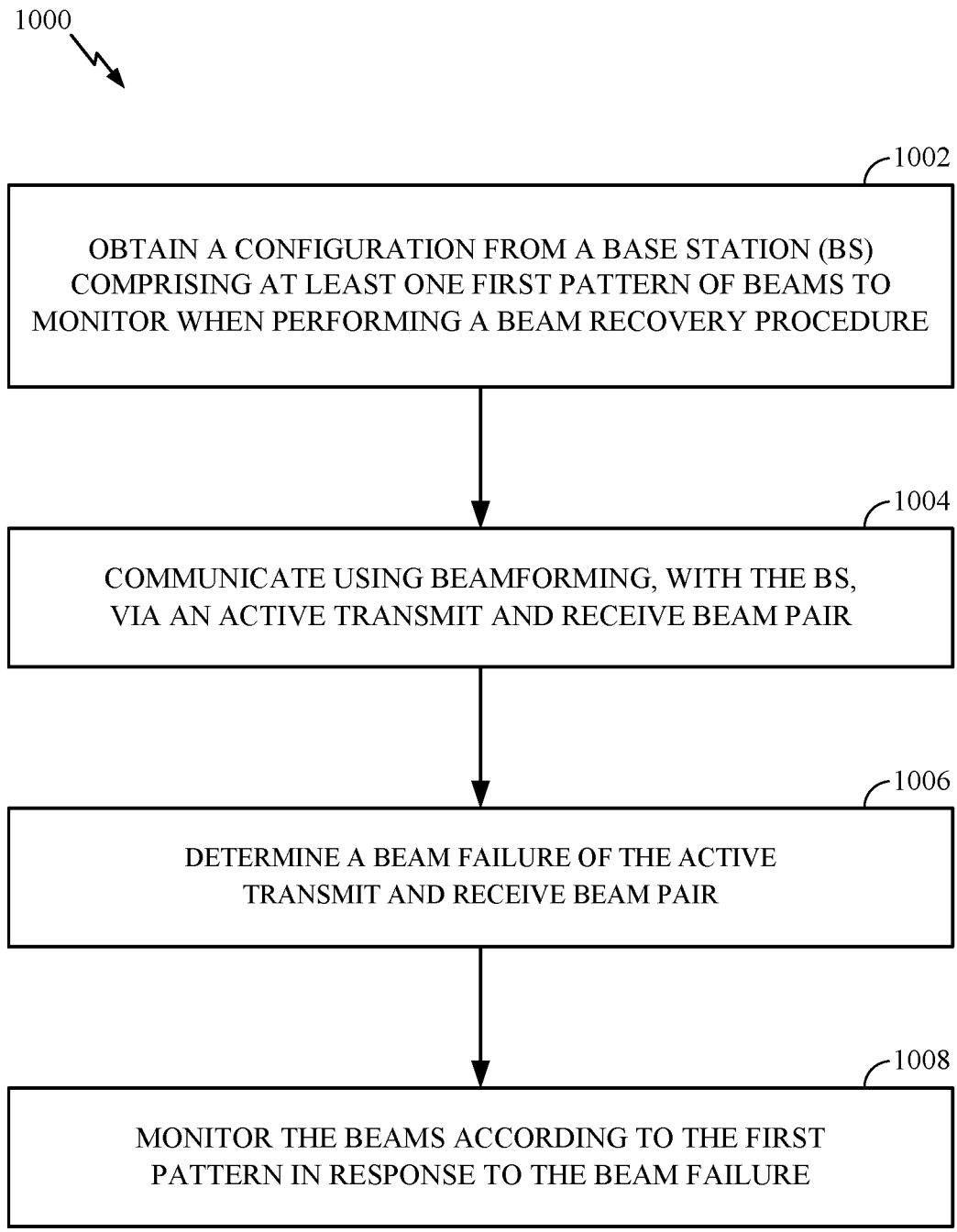
FIG. 10 shows example operations that may be performed by a UE, in accordance with aspects of the present disclosure.

FIG. 10 shows example operations 1000 for wireless communications, in accordance with aspects of the present disclosure. Operations 1000 may be performed by a UE, such as UE 120 shown in FIG. 1, for example.

Operations 1000 begin at block 1002 with obtaining a configuration from a base station (BS) comprising at least one first pattern of beams to monitor when performing a beam recovery procedure. For example, UE 120 (shown in FIG. 1) may obtain a configuration from a downlink control information (DCI) in a signal from BS 110a, wherein the configuration includes a pattern of beams for the UE to monitor when the UE is performing a beam recovery procedure.

At block 1004, operations 1000 continue with communicating using beamforming, with the BS, via an active transmit and receive beam pair. Continuing the example from above, the UE 120 communicates with (e.g., transmits to and/or receives from) the BS 110a using beamforming via an active transmit and receive beam pair.

Operations 1000 continue at block 1006 with determining a beam failure of the active transmit and receive beam pair. Still in the example from above, the UE 120 determines a beam failure of the active transmit and receive beam pair used in the communications in block 1004.

At block 1008, operations 1000 conclude with monitoring the beams according to the first pattern in response to the beam failure. Continuing the example from above, the UE 120 monitors beams according to the first beam pattern in response to the beam failure determined by the UE at block 1006.

Figure 11:
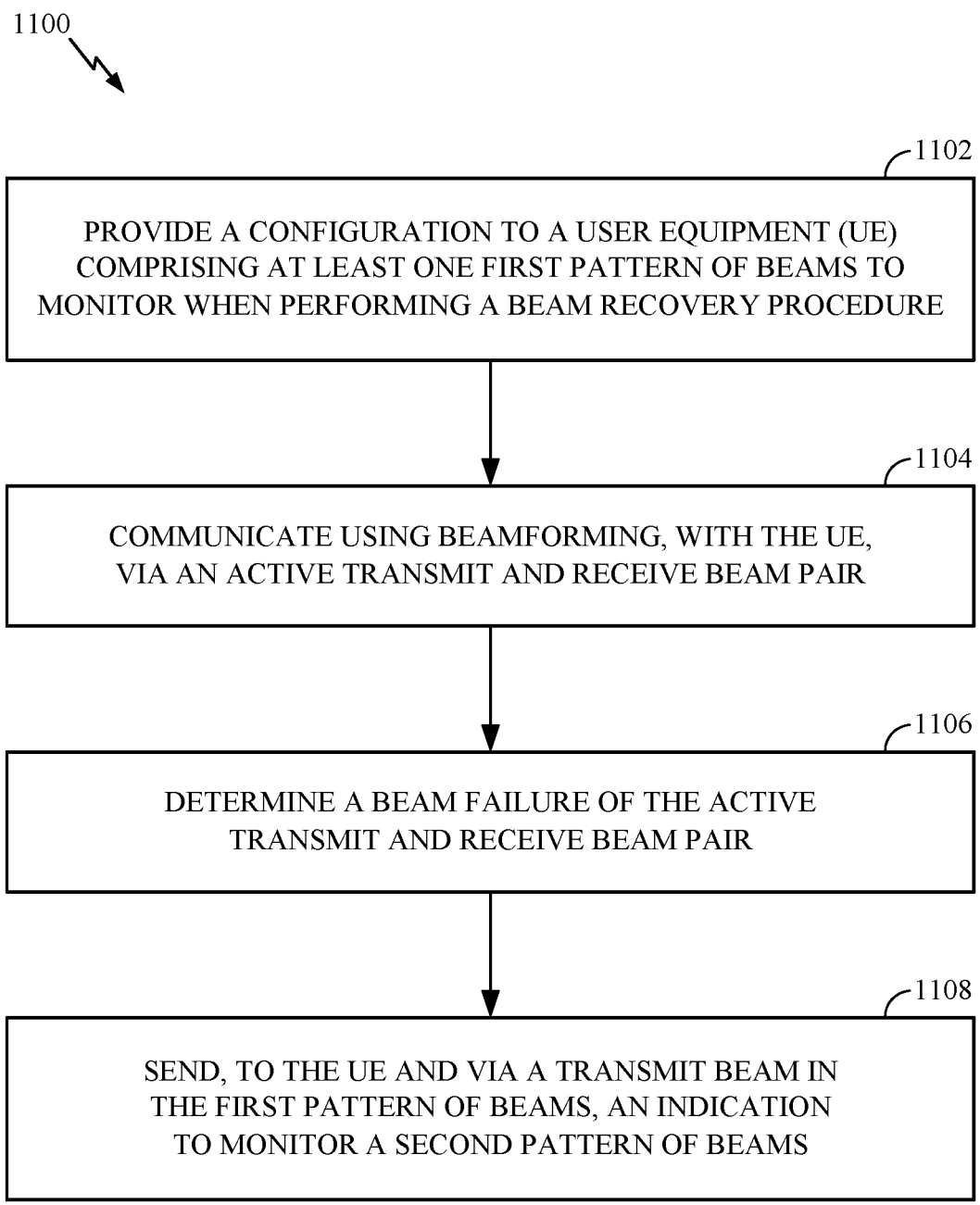
FIG. 11 shows example operations that may be performed by a BS, in accordance with aspects of the present disclosure.

FIG. 11 shows example operations 1100 for wireless communications, in accordance with aspects of the present disclosure. Operations 1100 may be performed by a BS, such as BS 110a shown in FIG. 1, for example. Operations 1100 may be considered complementary to operations 1000, shown in FIG. 10.

Operations 1100 begin at block 1102 with providing a configuration to a user equipment (UE) comprising at least one first pattern of beams to monitor when performing a beam recovery procedure. For example, BS 110a (shown in FIG. 1) provides a configuration in a downlink control information (DCI) to UE 120, wherein the configuration includes a pattern of beams for the UE to monitor when the UE is performing a beam recovery procedure.

At block 1104, operations 1100 continue with communicating using beamforming, with the UE, via an active transmit and receive beam pair. Continuing the example from above, the BS 110a communicates with (e.g., transmits to and receives from) the UE 120 using beamforming via an active transmit and receive beam pair.

Operations 1100 continue at block 1106 with determining a beam failure of the active transmit and receive beam pair. Still in the example from above, the BS 110a determines a beam failure of the active transmit and receive beam pair used in the communications in block 1104.

At block 1108, operations 1100 conclude with sending, to the UE and via a transmit beam in the first pattern of beams, an indication to monitor a second pattern of beams. Still in the example from above, the BS 110a sends to the UE 120, via a transmit beam in the first pattern of beams, an indication to monitor a second pattern of beams.

According to aspects of the present disclosure, an eNB may configure a pattern of beams for a UE to monitor for beam recovery. When the eNB detects a beam failure, the eNB may send a DCI (e.g., in a PDCCH) to the UE indicating a monitoring pattern to follow in monitoring for PDCCHs, and/or a rule to use in determining PUCCH beams to use for transmitting PUCCHs. For example, an eNB may indicate to a UE that a first rule is to transmit using PUCCH B1 after receiving a PDCCH via PDCCH B1 and to transmit using PUCCH B2 after receiving a PDCCH via PDCCH B2. In the example, the eNB may indicate that a second rule is to transmit using PUCCH B1 regardless of a PDCCH beam received, and a third rule is to transmit using PUCCH B2 regardless of a PDCCH beam received. Still in the example, the eNB may transmit an indication (e.g., in a DCI) of which rule a UE should be using when transmitting PUCCH to the eNB.

According to aspects of the present disclosure, an eNB (e.g., a BS) may wait for an implicit or explicit acknowledgment of a DCI indicating a monitoring pattern to follow, from the UE, before the eNB switches to transmitting PDCCHs to the UE according to the pattern indicated in the DCI. Having the UE acknowledge the beam switch command may improve robustness of beam switching and beam recovery operations. Acknowledgment of the DCI may be implicit. For example, an eNB may send a DCI indicating a monitoring pattern for the UE to follow and then transmit a PDSCH to the UE via one of the beams in the pattern. In the example, the UE receives the DCI with the monitoring pattern, begins monitoring according to the pattern, receives the PDSCH, and transmits an acknowledgment (ACK) of the PDSCH to the eNB, which the eNB interprets as acknowledgment of both the PDSCH and the DCI indicating the monitoring pattern. Still in the example, the UE may fail in decoding the PDSCH and send a negative acknowledgment (NAK) of the PDSCH. The eNB may interpret the NAK of the PDSCH as an implicit acknowledgment of the DCI, as the UE indicates that the UE is monitoring according to the pattern by sending the NAK of the PDSCH.

In aspects of the present disclosure, a beam monitoring pattern may comprise a single transmit and receive beam pair, and aspects referring to a pattern of beams may refer to a single transmit and receive beam pair.

In aspects of the present disclosure, an eNB may configure a pattern of beams for a UE to monitor for beam recovery. When the eNB detects a beam failure, the eNB may send a medium access control (MAC) control element (CE) to the UE indicating a monitoring pattern to follow in monitoring for PDCCHs, and/or a rule (e.g., base monitored beams on PDCCH, or based monitored beams on CSI-RS port sets) to use in determining PDCCH beams to monitor.

For example, an eNB may be communicating with a UE. Communicating with the UE may include transmitting PDCCHs to the UE via PDCCH beams $B_1$, $B_2$. In the example, the UE may transmit PUCCHs to the eNB via PUCCH beams $\tilde{B}_1$, $\tilde{B}_2$, with each PUCCH beam derived from $B_1$, $B_2$, respectively.

In the example, the eNB may send, via RRC signaling, a PDCCH monitoring configuration with 3 patterns configured for each "valid" (e.g., allowed to be used for a PDCCH to the UE) PDCCH slot. Still in the example, the first pattern (Pattern 1) may be to monitor $B_1$, $B_2$ with periodicity (1, 1), such that the UE monitors B1 during slots with even indices, and the UE monitors B2 during slots with odd indices. In the example, the second pattern (Pattern 2) may be for the UE to monitor $B_1$, $B_2$ with periodicity (39, 1), such that the UE monitors $B_1$ for a first set of 39 slots, and the UE monitors $B_2$ for a second set of 1 slot. (In Pattern 2, $B_2$ is to be used for fall back if $B_1$ fails.) Note that a pattern in which beam $B_2$ is monitored in 0 slots (e.g., a periodicity of (40, 0)) would imply that a UE cannot use the described aspects to recover from a beam failure if beam $B_2$ also fails. Still in the example, the third pattern (Pattern 3) may be for the UE to monitor $B_1$, $B_2$ with periodicity (1, 39), such that the UE monitors $B_1$ for a first set of one slot, and the UE monitors $B_2$ for a second set of 39 slots.

In the example, the UE has also been configured with a PUCCH beam selection rule such that a DCI signals which beam of $\hat{B}_1$ or $\hat{B}_2$ to use for PUCCH.

Still in the example, the eNB may use PDSCH beams that are derived from the PDCCH beams, e.g., the eNB may transmit a PDSCH using $\hat{B}_1$ that is derived from PDCCH beam $B_1$.

In another example, an eNB and a UE may be communicating using an active beam pair including a PDCCH beam 1 and a PDSCH beam 1, when the PDCCH beam 1 and PDSCH beam 1 fail (e.g., the beams are blocked due to movement by the UE). In the example, the eNB may observe the beam failure (e.g., due to not receiving ACKs from the UE) and quickly, via a DCI, for example, indicate to the UE that the UE should change to PDCCH monitoring pattern P3 during slot N, with the change taking effect at a time N+L. Still in the example, the eNB may indicate to the UE to send an ACK back at expected N+k1 slot (k1<L), via beam 2 (e.g., because beam 1 has failed). In the example, the UE may receive the DCI and send an ACK of the DCI in an N+k1 slot. Still in the example, if the eNB receives the ACK, then both the eNB and the UE switch to the new PDCCH monitoring pattern (pattern P3). In the example, if the ACK from the UE to the eNB fails, then the eNB can signal another beam switch and wait for an ACK of the other beam switch command. In the example, if the subsequent ACK fails, then the eNB may try some other beam (e.g., by sending another DCI indicating a beam to switch to) or trigger a beam recovery procedure.

According to aspects of the present disclosure, switching of PDSCH beams may have improved robustness by having PDSCH beam switching (e.g., commands to switch PDSCH beams) acknowledged by an ACK.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for sending, means for communicating, means for providing, and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, means for determining, means for selecting, means for providing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
obtaining, from a base station (BS), a configuration comprising a plurality of beam patterns including at least a first pattern of beams and a second pattern of beams to monitor when performing a beam recovery procedure;
monitoring beams according to the first pattern of beams;
receiving an indication to switch from the first pattern of beams to the second pattern of beams; and
monitoring beams according to the second pattern of beams.

2. The method of claim 1, further comprising sending a first acknowledgment (ACK) of the configuration to the BS, wherein sending the first ACK comprises transmitting an ACK of a second signal, different from the first signal, received from the BS via a beam in the first pattern of beams.

3. The method of claim 1, further comprising sending a first acknowledgment (ACK) of the configuration to the BS, wherein sending the first ACK comprises transmitting a negative acknowledgment (NAK) of a second signal, different from the first signal, received from the BS via a beam in the first pattern of beams.

4. The method of claim 1, further comprising:
sending a first acknowledgment of the configuration to the BS; and
sending a second acknowledgment of the indication.

5. The method of claim 4, wherein sending the second acknowledgment (ACK) comprises transmitting an ACK of a second signal, different from the first signal, received from the BS via a beam in the second pattern of beams.

6. The method of claim 4, wherein sending the second acknowledgment (ACK) comprises transmitting a negative acknowledgment (NAK) of a second signal, different from the first signal, received from the BS via a beam in the second pattern of beams.

7. The method of claim 4, further comprising communicating using beamforming, with the BS, via an active transmit and receive beam pair, wherein:
the first pattern of beams is the active transmit and receive beam pair, and
the second pattern of beams is another transmit and receive beam pair.

8. The method of claim 7, further comprising:
determining a beam failure of the active transmit and receive beam pair;
transmitting a physical uplink control channel (PUCCH) to the BS via a transmit beam selected according to the first pattern of beams subsequent to determining the beam failure.

9. A method for wireless communications by a base station (BS), comprising:
providing, to a user equipment (UE), a configuration comprising a plurality of beam patterns including at least a first pattern of beams and a second pattern of beams to monitor when performing a beam recovery procedure;
sending, to the UE and via a transmit beam in the first pattern of beams, an indication to switch from the first pattern of beams to the second pattern of beams.

10. The method of claim 9, further comprising:
receiving a first acknowledgment (ACK) of the configuration from the UE; and
transmitting a second signal, different from the first signal, via a beam in the first pattern of beams, wherein receiving the first ACK comprises receiving an ACK of the second signal from the UE.

11. The method of claim 9, further comprising:
receiving a first acknowledgment (ACK) of the configuration from the UE;
transmitting a second signal, different from the first signal, via a beam in the first pattern of beams, wherein receiving the first ACK comprises receiving a negative acknowledgment (NAK) of the second signal from the UE.

12. The method of claim 9, further comprising:
receiving a first acknowledgment (ACK) of the configuration from the UE;
receiving a second ACK of the indication; and
transmitting at least one transmission to the UE in a transmit beam selected according to the second pattern in response to receiving the second ACK.

13. The method of claim 12, wherein receiving the second ACK comprises receiving an ACK of the at least one transmission to the UE in the transmit beam selected according to the second pattern.

14. The method of claim 12, wherein receiving the second ACK comprises receiving a negative acknowledgment (NAK) of the at least one transmission to the UE in the transmit beam selected according to the second pattern.

15. The method of claim 14, further comprising communicating using beamforming, with the UE, via an active transmit and receive beam pair, wherein:
the first pattern of beams is the active transmit and receive beam pair, and
the second pattern of beams is another transmit and receive beam pair.

16. The method of claim 9, further comprising:
determining a beam failure of the active transmit and receive beam pair;
receiving a physical uplink control channel (PUCCH) from the UE via a transmit beam selected according to the first pattern of beams subsequent to determining the beam failure.

17. An apparatus for wireless communications, comprising:
a memory comprising executable instructions; and
a processor configured to execute the executable instructions and cause the apparatus to:
obtain, from a base station (BS), a configuration comprising a plurality of beam patterns including at least a first pattern of beams and a second pattern of beams to monitor when performing a beam recovery procedure;
monitor beams according to the first pattern of beams;
receive an indication to switch from the first pattern of beams to the second pattern of beams; and
monitor beams according to the second pattern of beams.

18. The apparatus of claim 17, wherein:
the processor is further configured to cause the apparatus to send a first acknowledgment (ACK) of the configuration to the BS, and
the first acknowledgement comprises an ACK of a second signal, different from the first signal, received from the BS via a beam in the first pattern of beams.

19. The apparatus of claim 17, wherein:
the processor is further configured to cause the apparatus to send a first acknowledgment (ACK) of the configuration to the BS, and
the ACK comprises a negative acknowledgment (NAK) of a second signal, different from the first signal, received from the BS via a beam in the first pattern of beams.

20. The apparatus of claim 17, wherein the processor is further configured to cause the apparatus to:
send a first acknowledgment (ACK) of the configuration to the BS, wherein the configuration comprises a plurality of patterns, and
send a second ACK of the indication.

21. The apparatus of claim 20, wherein, in order to send the second ACK, the processor is further configured to cause the apparatus to transmit an ACK of a second signal, different from the first signal, received from the BS via a beam in the second pattern of beams.

22. The apparatus of claim 20, wherein, in order to send the second ACK, the processor is further configured to cause the apparatus to transmit a negative acknowledgment (NAK) of a second signal, different from the first signal, received from the BS via a beam in the second pattern of beams.

23. The apparatus of claim 20, wherein:
the processor is further configured to cause that apparatus to communicate using beamforming, with the BS, via an active transmit and receive beam pair,
the first pattern of beams is the active transmit and receive beam pair, and
the second pattern of beams is another transmit and receive beam pair.

24. An apparatus for wireless communications, comprising:
a memory comprising executable instructions; and
a processor configured to execute the executable instructions and cause the apparatus to:
provide, to a user equipment (UE), a configuration comprising at least one first pattern of beams and a second pattern of beams to monitor when performing a beam recovery procedure;
send, to the UE and via a transmit beam in the first pattern of beams, an indication to switch from the first pattern of beams to the second pattern of beams.

25. The apparatus of claim 24, wherein:
the processor is further configured to cause the apparatus to:
receive a first acknowledgment (ACK) of the configuration from the UE, and
transmit a second signal, different from the first signal, via a beam in the first pattern of beams, and
in order to receive the first ACK, the processor is configured to cause the apparatus receive an ACK of the second signal from the UE.

26. The apparatus of claim 24, wherein:
the processor is further configured to cause the apparatus to:
receive a first acknowledgment (ACK) of the configuration from the UE,
transmit a second signal, different from the first signal, via a beam in the first pattern of beams, and
in order to receive the first ACK, the processor is configured to cause the apparatus to receive a negative acknowledgment (NAK) of the second signal from the UE.

27. The apparatus of claim 24, wherein the processor is further configured to cause the apparatus to:
receive a first acknowledgment (ACK) of the configuration from the UE;
receive a second acknowledgment (ACK) of the indication; and
transmit at least one transmission to the UE in a transmit beam selected according to the second pattern in response to receiving the second (ACK).

28. The apparatus of claim 27, wherein, in order to receive the second ACK, the processor is further configured to cause the apparatus to receive an ACK from the UE of the at least one transmission.

29. The apparatus of claim 27, wherein, in order to receive the second ACK, the processor is further configured to cause the apparatus to receive a negative acknowledgment (NAK) from the UE of the at least one transmission.

30. The apparatus of claim 27, wherein:
the processor is further configured to cause the apparatus to communicate using beamforming, with the UE, via an active transmit and receive beam pair,
the first pattern of beams is the active transmit and receive beam pair; and
the second pattern of beams is another transmit and receive beam pair.

31. A method for wireless communications by a user equipment (UE), comprising:
obtaining, from a base station (BS), a configuration comprising at least one first pattern of beams to monitor for a downlink control channel; and
determining at least one uplink control channel beam to use for transmission based, at least in part, on the at least one first pattern of beams to monitor for the downlink control channel, wherein determining the uplink control channel beam comprises deriving the at least one uplink control channel beam from one or more downlink control channel beams indicated in the at least one first pattern of beams.

32. The method of claim 31, wherein:
the downlink control channel comprises a physical downlink control channel (PDCCH); and
the uplink control channel comprises a physical uplink control channel (PUCCH).

33. The method of claim 31, further comprising transmitting an uplink control channel using the determined at least one uplink control channel beam.

34. The method of claim 31, further comprising receiving signaling indicating the at least one uplink control channel beam.

35. The method of claim 34, wherein the signaling is received in downlink control information (DCI).

* * * * *